United States Patent [19]

Conti

[11] 4,413,525
[45] Nov. 8, 1983

[54] BOURDON TUBE CONSTRUCTION

[75] Inventor: Jack Conti, Norwalk, Conn.

[73] Assignee: Dresser Industries, Inc., Dallas, Tex.

[21] Appl. No.: 184,864

[22] Filed: Sep. 8, 1980

[51] Int. Cl.$^3$ .............................................. G01L 7/04
[52] U.S. Cl. ...................................... 73/741; 228/151
[58] Field of Search ............. 228/146, 147, 151, 17.5, 228/17; 73/741, 742, 743

[56] References Cited

U.S. PATENT DOCUMENTS

| 9163 | 3/1852 | Bourdon . | |
|---|---|---|---|
| 500,830 | 7/1893 | Winter | 73/741 |
| 2,644,336 | 7/1953 | Bowditch | 73/741 |
| 3,280,609 | 2/1966 | Lehnert | 72/176 |
| 3,520,165 | 7/1970 | Dodson | 228/147 |
| 3,846,610 | 5/1974 | Asselborn et al. | 219/61 |
| 4,081,648 | 8/1978 | Rudd et al. | 219/59.1 |

FOREIGN PATENT DOCUMENTS 53-5062   1/1978   Japan .
661778  11/1951   United Kingdom ................. 73/741

OTHER PUBLICATIONS

"Uprugie Elementy Priborov," L. E. Andreeva, 1966, Chapter VII, Elastic Elements of Instruments, Russian to English translation)—see part 46, pp. 42–53.
Catalog 77210M, Precision Tube Co.—FIG. 3.

Primary Examiner—Donald O. Woodiel
Attorney, Agent, or Firm—Daniel Rubin

[57] ABSTRACT

Bourdon tubing is constructed from metal strip by roll forming the strip into a desired tubular cross section with the opposed edges abutting longitudinally at a location in the cross section at which contemplated operational stresses are predetermined to be relatively low. After continuously welding the edges in a pressure-tight relation, the tubing can be shaped along its length into a Bourdon tube configuration without need for further metallurgical mill processing.

18 Claims, 22 Drawing Figures

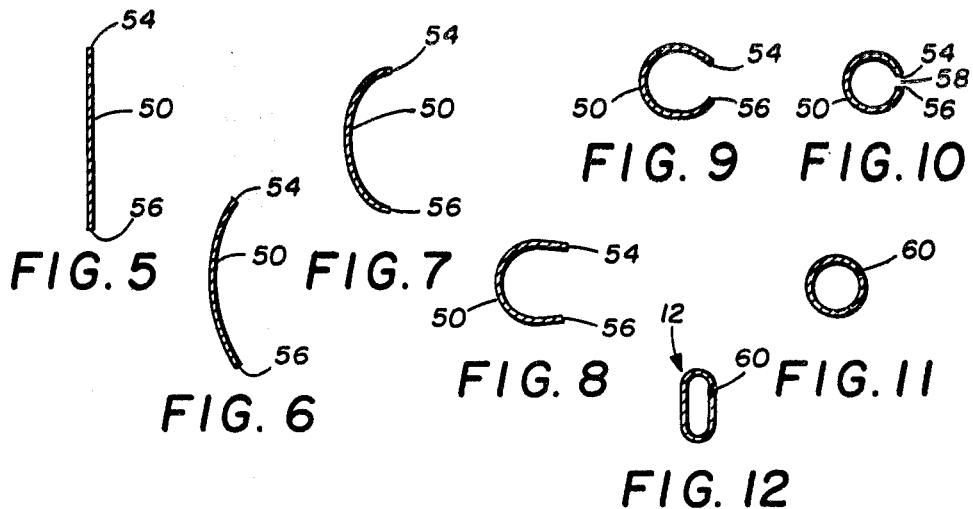
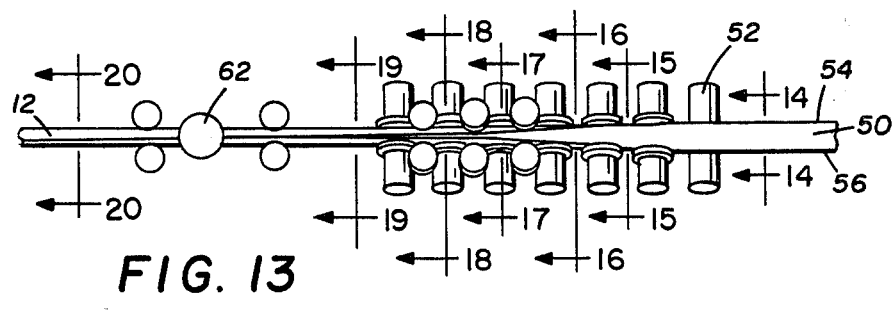
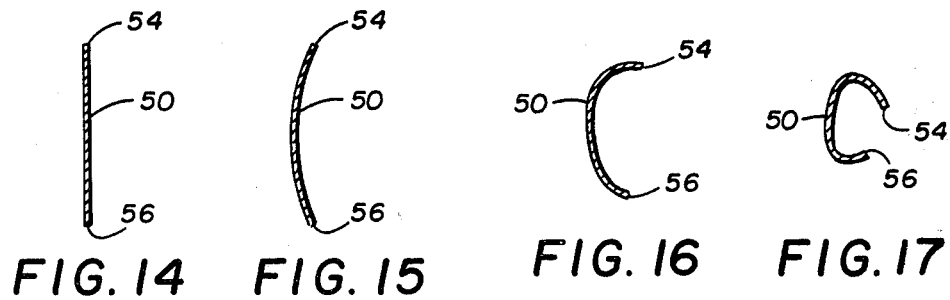
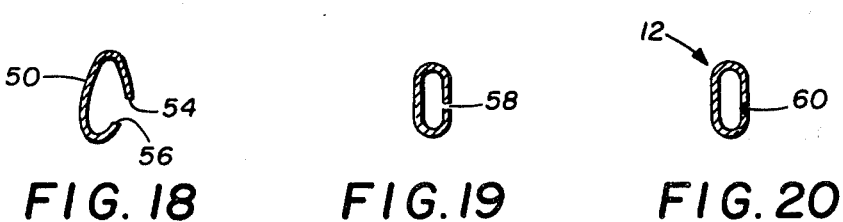

BOURDON TUBE CONSTRUCTION

TECHNICAL FIELD

The field of art to which the invention pertains comprises the art of measuring and testing as related to fluid pressure gauges.

BACKGROUND OF THE INVENTION

Pressure gauges enjoy very extensive commercial and industrial use and are consequently regarded as high production items. Because of such wide use, they are supplied by a plurality of manufacturers and sold in very price conscious competition. Each manufacturer instinctively strives to reduce product costs by improvements, however marginal, which reduce labor and/or materials that can contribute to cost savings in the end product.

Commonly affording pressure sensitivity in the pressure gauge is the Bourdon tube being a tube of a pressure-tight construction having a free end displaceably movable in a well known and predictable manner in response to pressure changes supplied at its inlet. To translate tube movement into values of pressure, a pointer opposite a calibrated dial plate is displaceably driven by the free end of the tube.

It can be appreciated that the Bourdon tube under in-service conditions encounters operational stresses which in effect contribute to its characteristic displacement in response to pressure changes to which it is exposed. At the same time, such stresses if not properly accommodated can produce premature failure of the tube. To minimize possibility of the latter while retaining its characteristic displacement property, it has long been the practice to produce Bourdon tubes from a homogeneous product formed either from seamless tubing or from welded and drawn tubing. In the seamless tubing variety, tubing is produced by first piercing a round billet and thereafter reducing its size in a plurality of sequentially effected cold drawing operations with intermediate anneals. Welded and drawn tubing, by contrast, is produced by fusion welding strip to produce a round master tube. The tube is then reduced in a plurality of repeated cold drawing and annealing steps until finally achieving the required final Bourdon tube equivalent round.

The purpose of cold drawing and annealing in accordance with these prior practices has been not only to achieve final size but to homogenize the weldstructure, since it is well known that the mechanical properties of weldments are not equivalent to that of wrought alloy forms. Consequently, by drawing and annealing a cast weld microstructure, welded tubing is gradually changed to more nearly correspond with that of wrought strip material.

It can be appreciated therefore that producing a Bourdon tube from tubing formed from either of the mentioned prior art approaches requires extensive metallurgical mill processing in order to achieve the desired end result. Such processing however is known to contribute significantly toward the end cost thereof. Despite recognition of the problem, it has not been known heretofore how to produce such tubing in a less costly manner.

SUMMARY OF THE INVENTION

The invention relates to Bourdon tubes and more specifically to a less costly construction and method of construction than previously utilized in the prior art. This is achieved in accordance herewith by first ascertaining in advance the location on the contemplated cross section of tubing at which in-service operational stresses will be relatively low. The tubing is then roll formed from strip metal to a desired tubular cross sectional shape in which the opposite edges longitudinally abut at a cross sectional location identified as having the low operational stress. The formed strip is then continuously welded to join the opposed edges in a pressure-tight relation after which the tubing is cut to length and shaped to a desired Bourdon tube configuration.

With the weld having been placed at the low stress location on the cross section, it has been found, despite the non-homogeneous structure produced by the weld, not to interfere with characteristic Bourdon tube displacement operation of such tubing. Since the foregoing enables direct formation of a Bourdon tube from as-welded tubing which eliminates the numerous drawing and annealing steps conventionally employed by the prior art, the economy afforded thereby significantly enhances the manufacturer's competitive cost with respect to such tubes.

It is therefore an object of the invention to provide a novel construction and method of construction for tubing from which to fabricate a Bourdon tube.

It is a further object of the invention to provide a novel method for constructing a Bourdon tube.

It is a still further object of the invention to effect the foregoing objects in a less costly manner than with similar purpose Bourdon tube constructions of the prior art.

BRIEF DESCRIPTION OF THE DRAWINGS

FIGS. 5 through 12 are progressive sectional views taken through the various stages of tube formation at the corresponding sectionally indicated locations of FIG. 4;

FIG. 13 schematically illustrates a tube production fabrication similar to FIG. 4 in accordance with a second embodiment hereof;

FIGS. 14 through 20 are progressive sectional views taken through the various stages of tube formation at the corresponding sectionally indicated locations of FIG. 13;

Figure 1:
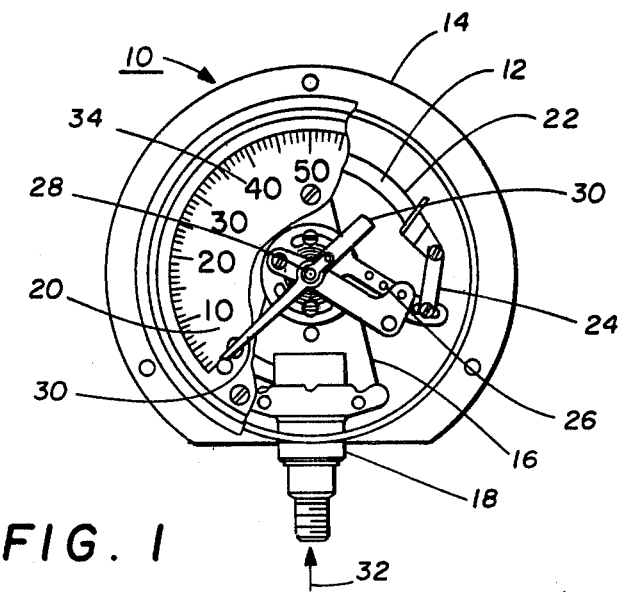
FIG. 1 is a front elevation partially sectioned of a pressure gauge exemplifying use of a Bourdon tube in accordance herewith.

Referring first to FIG. 1, there is illustrated a pressure gauge designated 10 exemplifying use of a Bourdon tube 12 in accordance herewith to be described. Forming the gauge instrument is a generally annular casing 14 supporting a rear plate 16 which in combination with a socket 18 and mounting plate supports a dial plate 20. Socket 18 communicates measured pressure received at its inlet internally to Bourdon tube 12. The free end 22 of the Bourdon tube supports a connecting linkage 24 which through an amplifying movement 26 drives a pointer shaft 28 supporting pointer 30. The gauge operates in a well known manner such that pressure supplied to socket 18, as represented by arrow 32, is transmitted internally of Bourdon tube 12 causing free end 22 to wind and unwind in correlated response to changing values of supply pressure. Displacement of free end 22 is translated through the linkage 24 and movement 26 to displace pointer 30 until the latter is opposite dial registration 34 corresponding to the value of pressure being supplied. It can well be appreciated that in the course of operation Bourdon tube 12 performs in the upper part of its elastic region such that it constantly operates under a highly stressed condition.

The stresses to be encountered in the Bourdon tube will, of course, vary with the physical properties of its metal such as its elastic modulus, geometric configuration of its cross section, radius of the tube and contemplated pressure levels to be encountered. For a known construction the stress distribution can be ascertained in advance in the manner taught, for example, by L. E. Andreeva in "Uprugie Elementy Priborov," Chapter 7, "Elastic Elements of Instruments" published in 1966.

Figure 22:
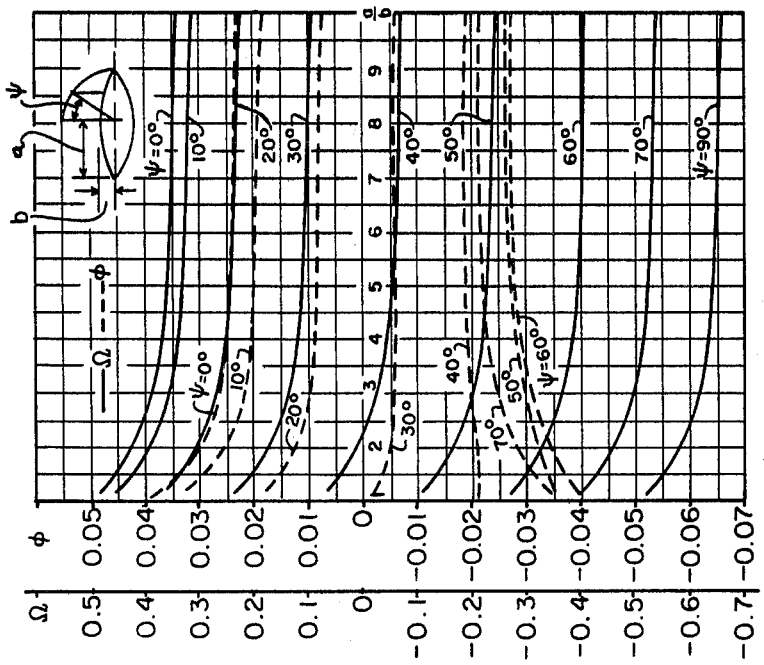
FIG. 22 is a graphical (prior art) representation of coefficients for tubes of elliptical cross-section.
Figure 21:
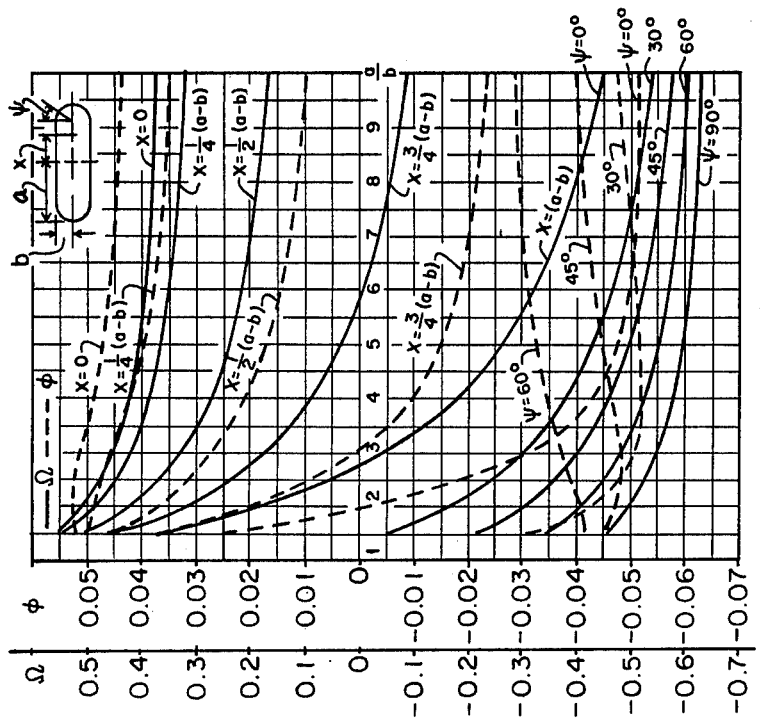
FIG. 21 is a graphical (prior art) representation of coefficients for tubes of flattened cross-section.

Briefly, as set forth in the foregoing publication, the axial stress $S_a$ and the transverse stress $S_t$ for an ascertained mean contour change of curvature and relative angle of rotation at any arbitrary point on the external or internal contour can be represented in the following form:

$$S_a = p \frac{R^2}{a^2}\left(1 - \frac{b^2}{a^2}\right) \frac{3}{\beta + x^2}\left(\frac{2}{x}\phi \pm \mu\Omega\right)$$

$$S_t = p \frac{R^2}{a^2}\left(1 - \frac{b^2}{a^2}\right) \frac{3}{\beta + x^2}\left(\pm\Omega + \mu\frac{2}{x}\phi\right)$$

where
p = the working pressure;
R = the radius of the central tube axis;
a and b = the cross-section semiaxes;
x = (Rh)/(a$^2$) = the principal tube parameter;
h = the wall thickness;
$\beta$ = a coefficient which varies with each tube cross section for the ratio of a/b;
$\omega$ = arbitrary point deflection on the mean contour in a y axis direction $\Omega$ and $\phi = \omega - \frac{a}{6}\cos\phi$ = functions of the position of the point on the contour as determined by x and y coordinates (FIGS. 21 and 22)

The resultant stress $S_r$, assuming a biaxial stress state, is:

$$S_r = \sqrt{S_a^2 + S_t^2 - S_a S_t}$$

Figure 2:
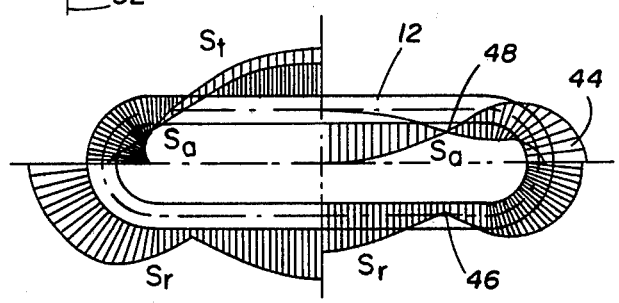
FIG. 2 is a typical operational stress diagram for a flattened cross section Bourdon tube in accordance herewith.
Figure 3:
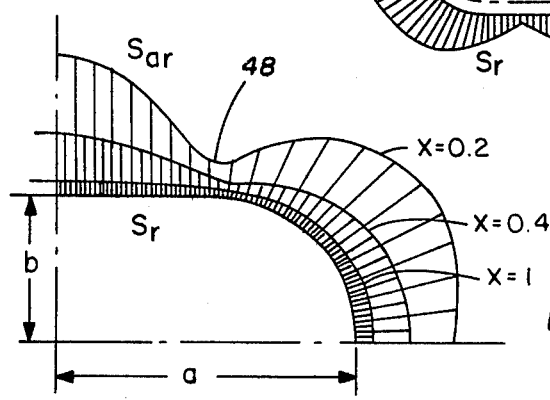
FIG. 3 is a typical fragmentary enlarged operational stress diagram at the most highly stressed points on the external or internal contour of a tube of flattened cross section for a predetermined dimension rate.
Figure 4:
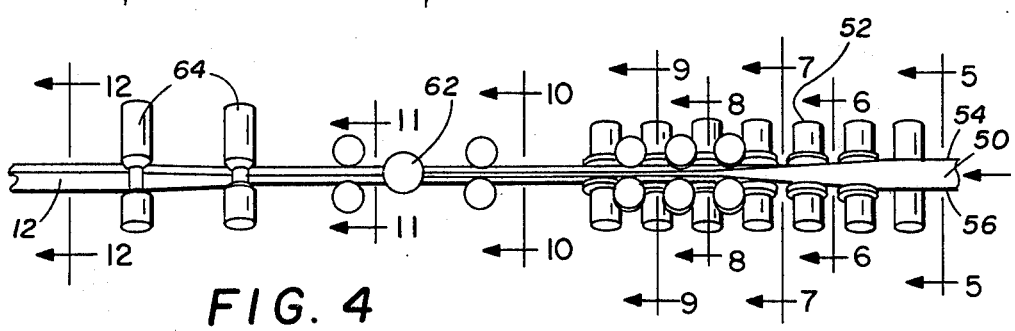
FIG. 4 schematically illustrates the production fabrication of a Bourdon tube in accordance with a first embodiment hereof.

In the diagram of FIG. 2 derived from the foregoing, the operational stress forces $S_a$, $S_t$ and $S_r$ forces at the various locations are represented by linear lengths 44 expressed as kg/cm$^2$ so as to identify the locations 46 and 48 to be of lowest stress. In the diagram of FIG. 3, the resultant stress $S_r$ is illustrated for a dimension ratio a/b=2.

Having determined the location 48 of minimum operational stress in the contemplated cross section of tube 12, formation of the tubing is effected as will now be described with reference to FIGS. 4–12. It can be seen therefrom that tube formation is initiated from strip metal 50 having parallel side edges 54 and 56. Suitable for that purpose is a weldable metal such as phosphor bronze, beryllium copper, 316 stainless, monel K-500 or Inconel 718. Typically, the strip is on the order of one to two inches wide and 0.008 to 0.025 inches in thickness and is fed progressively between a plurality of paired forming rollers 52. On reaching the forming stage represented by FIG. 10, the strip is of near circular cross section with opposed edges 54 and 56 closely abutting to define a longitudinal weld gap 58. On then being passed through welding head 62, the tube is fusion welded along gap 58 at 60 being being passed through final shaping rolls 64 for achieving the finished flattened cross section illustrated in FIG. 12. Welding head 62 is of a type commercially available and can, for example, comprise either the gas tungsten arc or laser type.

For the embodiment of FIGS. 13–20, the tubing is finally shaped (FIG. 19) prior to welding at 60 rather than after in the manner of the first embodiment.

Critical to formation of the tubing just described is that gap 58 extend longitudinally at a location which in the finished cross section of FIG. 12 corresponds to the determined low stress location 46 or 48 supra. With the tubing thus formed, it can thereafter be cut to length and directly shaped to any desired Bourdon tube configuration without need for further metallurgical mill processing. Configurations in which Bourdon tubes are customarily utilized include C-shape, coil, helical, etc. while sealing of free end 22 is usually effected before joining tube 12 to socket 18.

By the above description there is disclosed novel construction and method of constructing Bourdon tubing directly from strip without the need for intermediate cold drawing and annealing operations in the manner of the prior art. By eliminating the drawing and annealing operations, the direct fabrication from strip provides economy of manufacture and efficient use of material. Moreover, since strip material can readily be rolled to closer tolerances than the wall of a cold drawn tube, the construction results in tubing of improved eccentricity and wall thickness tolerances. By the simple technique therefore of direct progressive forming and welding of the strip and using the tubing as-welded without further metallurgical mill operations, substantial economies of labor and materials are readily realized as compared to the conventional techniques employed in the prior art for fabricating such tubing.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property of privilege is claimed are defined as follows:

1. The method of fabricating a Bourdon tube comprising the steps of:
 (a) forming a predetermined length of tubing of selected cross section from strip metal longitudinally welded seal tight at an edge gap located on the tubing cross section corresponding to a predetermined near minimal operational stress area for a contemplated in-service Bourdon tube;
(b) shaping said tubing into a desired Bourdon tube configuration for said contemplated in-service while substantially maintaining the location relation of said seal to said stress area; and
(c) sealing one end of said tubing to comprise the displacement end of the Bourdon tube.

2. The method of fabricating a Bourdon tube of contemplated cross section and configuration comprising the steps of:
(a) ascertaining the distribution of stress forces about the contemplated finished cross section of tube configuration to be fabricated for an in-service Bourdon tube;
(b) progressively forming strip metal into tubing of said contemplated cross section with the opposed edges of the strip placed in a longitudinally extending abutting relation at a location corresponding to a near minimal operational stress area ascertained for said contemplated cross section;
(c) progressively joining said opposed edges in a pressure seal relation to enclose the tubing thereat;
(d) shaping a predetermined length of said tubing into said contemplated Bourdon tube configuration while substantially maintaining the location relation of said seal to said stress area; and
(e) sealing one end of said tubing to comprise the displacement end of the Bourdon tube.

3. The method of fabricating a Bourdon tube according to claim 2 in which said strip metal is characterized by weldable properties and the joining of said opposed edges is effected by welding.

4. A Bourdon tube comprising:
(a) tubing sealed at one end and open at the other end and formed of strip metal longitudinally welded closed at a location on the cross-section corresponding to a predetermined near minimal operational stress area for the contemplated pressure service of the Bourdon tube;
(b) said tubing being shaped for said contemplated pressure service in a longitudinal direction adapted for the sealed end thereof to displace in a predictable manner in response to changes in fluid pressure supplied to the open end thereof.

5. A Bourdon tube according to claim 4 in which said tubing is of flattened cross-section.

6. A Bourdon tube according to claim 4 in which said tubing is of elliptical cross-section.

7. A Bourdon tube according to claim 4, 5 or 6 in which said tubing is longitudinally shaped in a "C"-configuration.

8. A Bourdon tube according to claim 4, 5 or 6 in which said tubing is longitudinally shaped in a coiled configuration.

9. A Bourdon tube according to claim 4, 5 or 6 in which said tubing is longitudinally shaped in a helical configuration.

10. In a pressure gauge, a Bourdon tube comprising:
(a) tubing sealed at one end and open at the other end and formed of strip metal longitudinally welded closed at a location on the cross-section corresponding to a predetermined near minimal operational stress area for the contemplated pressure service of the Bourdon tube; and
(b) said tubing being shaped for said contemplated pressure service in a longitudinal direction adapted for the sealed end thereof to displace in a predictable manner in response to changes in fluid pressure supplied to the open end thereof.

11. In a pressure gauge according to claim 10 in which said tubing is of flattened cross-section.

12. In a pressure gauge according to claim 10 in which said tubing is of elliptical cross-section.

13. In a pressure gauge according to claim 10, 11 or 12 in which said tubing is longitudinally shaped in a "C"-configuration.

14. A Bourdon tube according to claim 10, 11 or 12 in which said tubing is longitudinally shaped in a coiled configuration.

15. A Bourdon tube according to claim 10, 11 or 12 in which said tubing is longitudinally shaped in a helical configuration.

16. The method of fabricating a Bourdon tube comprising the steps of:
(a) forming a predetermined length of tubing from strip metal longitudinally welded seal tight as an edge gap;
(b) shaping said tubing into a cross section for a contemplated in-service Bourdon tube with the seal on said cross section being located at a predetermined near minimal operational stress area thereof;
(c) shaping said tubing into a desired Bourdon tube configuration for said contemplated in-service while substantially maintaining the location relation of said seal to said stress area; and
(d) sealing one end of said tubing to comprise the displacement end of the Bourdon tube.

17. The method of fabricating A Bourdon tube of contemplated cross section and configuration comprising the steps of:
(a) ascertaining the distribution of stress forces about the contemplated finished cross section of tube configuration to be fabricated;
(b) progressively forming strip metal into tubing with opposed edges of the strip placed in a longitudinally extending abutting relation;
(c) progressively joining said opposed edges in a pressure seal relation to enclose the tubing thereat;
(d) shaping said tubing into said contemplated cross section with the seal on said cross section being located at the ascertained near minimal operational stress area therefor;
(e) shaping a predetermined length of said tubing into said contemplated Bourdon tube configuration while substantially maintaining the location relation of said seal to said stress area; and
(f) sealing one end of said tubing to comprise the displacement end of the Bourdon tube.

18. The method of fabricating a Bourdon tube according to claim 17 in which said strip metal is characterized by weldable properties and the joining of said opposed edges is effected by welding.

* * * * *